Patented Sept. 4, 1928.

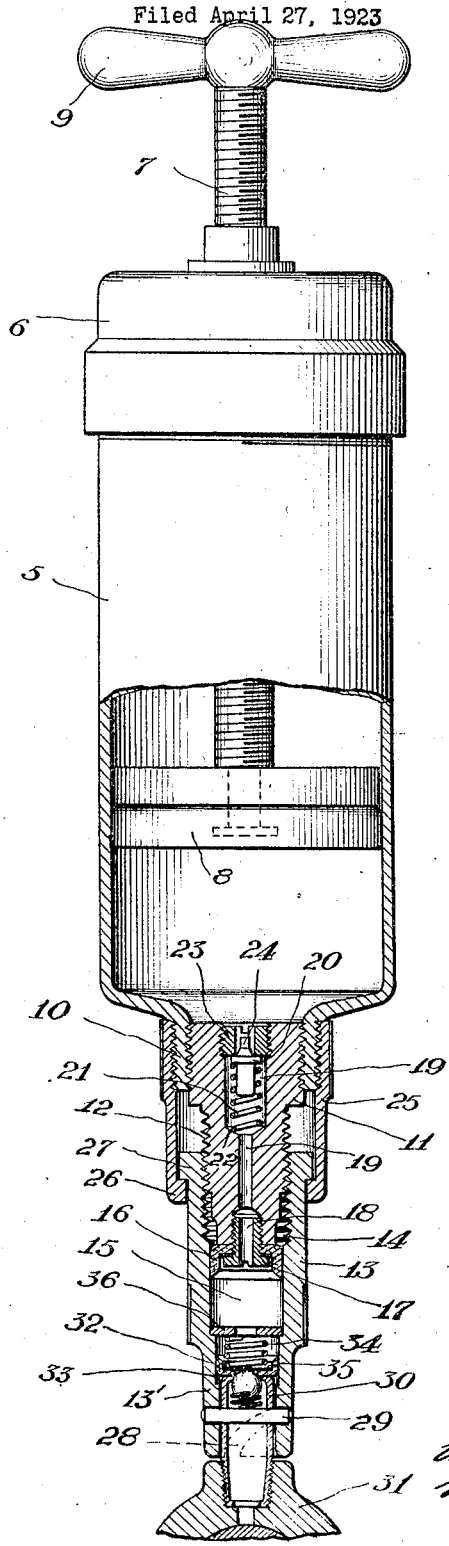

UNITED STATES PATENT OFFICE.

1,682,935

JOHN N. ROBIN, OF CHICAGO, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed April 27, 1923. Serial No. 634,942.

My invention relates to improvements in lubricant compressors, and is particularly concerned with the provision of a lubricant compressor adapted to form a part of a lubricating system, comprising a plurality of nipples or fittings secured to the bearings to be lubricated, and a compressor for successively supplying lubricant under high pressure to said nipples or fittings.

The objects of my invention are:

First; to provide a compressor of the character described, by means of which very high pressures may be obtained easily and quickly whenever such high pressures are required for forcing lubricant into a bearing.

Second; to provide a compressor such as described, comprising means capable of easily supplying a comparatively large quantity of lubricant to a bearing whenever the resistance to the passage of lubricant through the bearing is not too great, and other means for easily increasing the pressure upon the lubricant whenever a bearing is encountered which offers excessive resistance to the passage of lubricant therethrough.

Third; to provide a compressor of the character described, in which the means for increasing the pressure on the lubricant automatically goes into action whenever the resistance to the passage of lubricant into the bearing becomes so great as to make it difficult to supply lubricant thereto with the means designed to exert comparatively low pressure thereon.

Fourth; to provide a compressor such as described, which is simple in construction, economical to manufacture, rugged and easy to operate.

Other objects of my invention will appear as this description progresses, reference being had to the accompanying drawing, wherein I have shown a central longitudinal section through a portion of my lubricant compressor, which involves the novel features hereinafter claimed.

The embodiment of my invention which I have illustrated herein, comprises a barrel 5, the open end of which is provided with a cap 6, which is detachably secured thereto preferably by means of a screw threaded connection. A piston rod 7 is threaded through the end of the cap and carries at its inner end a piston 8, which may be of any suitable construction capable of withstanding a comparatively high degree of pressure. The outer end of the piston rod 7 is provided with a handle 9 by means of which it can be rotated. The construction thus far described is purely conventional in form and forms no part of my present invention except as it co-acts with the features of my invention about to be described.

The end of the barrel opposite the cap 6 is provided with an externally and internally threaded nipple 10. The rigid discharge conduit 11 is threaded into the nipple 10 and extends outwardly therefrom. The outer end of this conduit is preferably reduced somewhat in cross section, as shown in the drawing, and a portion thereof intermediate its ends is provided with screw threads 12. The sleeve 13 is provided with internal threads 14 adjacent its inner end for co-acting with the threads 12 of the discharge conduit 11. The sleeve 13 is provided with a smooth bore 15 for receiving the outer end of the discharge conduit. A cup leather 16 is secured to the outer end of the discharge conduit 11 by means of the screw 17, which has a longitudinal bore 18 extending therethrough and communicating with the bore 19 of the discharge conduit. The cup leather 16 provides means for insuring a tight joint between the outer end of the discharge conduit and the walls of the bore 15, so when the discharge conduit is threaded into the sleeve 13, the bore 15 and the outer end of the discharge conduit will act as a cylinder and plunger for exerting pressure upon the lubricant contained in the outer end of the sleeve 13.

The inner end of the bore of the discharge conduit is enlarged as shown at 19' for receiving the outwardly opening check valve 20 and the spring 21, one end of which bears against the check valve and the other end of which rests against the shoulder 22 formed by enlarging the bore. The inner end of the check valve 20 is provided with a stem 24 which extends into the opening in the valve seat 23 to insure the proper seating of the valve under the influence of the spring 21. The spring 21 can be a comparatively light spring, as its function is principally that of preventing the high pressure developed in the bore 15 from being communicated to the barrel of the compressor. It, of course, has the other function of preventing the flow of lubricant from the barrel of the compressor when the compressor is not in use.

A second sleeve 25 is threaded upon the nipple 10 and extends outwardly. The outer end of this sleeve has an inwardly extending annular shoulder 26 adapted to co-act with a corresponding outwardly extending shoulder 27 formed on the inner end of the sleeve 13 to limit the outward movement of the last mentioned sleeve.

The outer end of the sleeve 13 is reduced in cross section as shown at 13', and is provided with bayonet slots 28 adapted to receive the outwardly extending ends of the pin 29, which passes through the lubricant nipple or fitting 30 which I have here shown as being secured to a bearing 31 to be lubricated. The construction of the fitting 30 is well known, and the means which I have described for making a mechanical connection therewith are also well known, and further description thereof appears to be unnecessary. For sealing the connection between the sleeve 13 and the fitting 30 so that lubricant under high pressure can be supplied to the fitting, I provide a cup leather 32 which normally seats against the shoulder 33 formed in the outer end of the sleeve 13, and which is yieldingly held in contact with the end of the fitting by means of a spring 34, one end of which rests upon a washer 35 resting upon the bottom of the cup leather, and the other end of which abuts a washer 36 which is forced tightly to its seat in the bore 15. The construction just described is such that when the connection with the fitting is first made, the cup-leather is held in sealing relation with the end of the fitting, and when the compressor is manipulated to exert pressure upon the lubricant contained therein, the seal between the cup leather and the end of the fitting increases with increase in pressure upon the lubricant.

In using my improved compressor, the operator passes the outer end of the sleeve 13 over the fitting 30 and by giving a rotary movement to the barrel, causes the ends of the pin 29 to move into the bayonet slots so as to mechanically connect the lubricator with the fitting. At the same time, the cup-leather 32 is pressed inwardly against the tension of the spring 34. The operator then grasps the handle 9 and turns it in the direction to move the piston 8 inwardly, so as to place the lubricant in the compressor under pressure. If the resistance to the passage of lubricant into the bearing is not too great, the lubricant will pass from the barrel of the compressor through the check valve, the bore 19 of the discharge conduit, and the bore of the sleeve into the bearing. If, however, the resistance of the bearing is too great to permit this easily to be accomplished, the operator continues to turn the handle 9, and when the pressure in the compressor reaches a certain degree, the discharge conduit 11 will begin to rotate in the sleeve 13 which is held against rotation by its connection with the fitting, and the outer end of the discharge conduit will advance into the bore 15 of the sleeve 13. Owing to the comparatively small cross-sectional area of the outer end of the discharge conduit and the threaded connection between the discharge conduit and the sleeve 13, an enormous pressure can be developed in the outer end of the sleeve 13 without requiring the application of any considerable force couple to the handle 9. In this manner, the old and used lubricant can be displaced from the bearing, and as soon as this is accomplished, lubricant can be forced thereinto solely by the movements of the piston 8 in the barrel 5 and without any great exertion. Either before or after detaching the compressor from the fitting, the operator can hold the sleeve 13 against rotation, and by then rotating the barrel 5, the sleeve 13 and the discharge conduit can be returned to the relative positions shown in the drawing so as to be ready to be used in case another bearing requiring high pressure is encountered.

From the above description, it will be seen that I have provided a construction by means of which comparatively large quantities of lubricant can be supplied to bearings under comparatively high pressure by making use only of the piston 8, but that if necessity demands, much higher pressures can be obtained by making use of the novel arrangement of the discharge conduit and the sleeve 13. It will also be seen that by providing the check valve 20 I prevent the high pressures developed in the outer end of the sleeve 13 from being communicated to the contents of the barrel 5, so that it is not necessary to construct the piston 8 to withstand pressures as high as those which may be developed in the outer end of the sleeve 13.

While I have described the details of construction of the preferred embodiment of my invention, it is to be clearly understood that my invention is not limited thereto, but is capable of other adaptations and modifications within the scope of the appended claims.

Having thus described my invention, what I claim is:

1. A lubricant compressor comprising a barrel having a rigid discharge conduit, a portion of said conduit intermediate its ends being threaded, a sleeve having internal threads at its inner end for co-acting with the threaded portion of said conduit and a bore for receiving the outer end of said conduit, the outer end of said sleeve being provided with means for making a sealed connection with the lubricant receptacle, a cup leather carried by the outer end of said conduit, an outwardly opening check valve for controlling the flow of lubricant through said conduit, a second sleeve secured to said discharge conduit and limiting the outward movement of said first named sleeve relatively to said conduit, a piston in said barrel, a screw threaded piston rod extending through the end of said barrel opposite said discharge conduit, and a handle for rotating said piston rod.

2. A lubricant compressor comprising a barrel, concentric fixed tubes projecting from one end of said barrel, the inner tube forming a discharge conduit for said barrel, an outwardly opening check valve in said conduit, a third tube nested between said first mentioned tubes, means on said third tube and the inner one of said first tubes for producing telescopic movement of said third tube, means on said third tube and the outer one of said fixed tubes for limiting said telescopic movement, and a compressing piston in said third tube mounted on the end of the inner fixed tube.

3. A lubricant compressor comprising a barrel, concentric fixed tubes projecting from one end of said barrel, the inner tube forming a discharge conduit for said barrel, an outwardly opening check valve in said conduit, a third tube nested between said first mentioned tubes, means on said third tube and one of said first tubes for producing telescopic movement of said third tube, means on said third tube and one of said fixed tubes for limiting said telescopic movement, and a seal for preventing leakage between said third tube and said inner tube.

4. A lubricant compressor comprising a barrel, concentric fixed tubes projecting from one end of said barrel, the inner tube forming a discharge conduit for said barrel, an outwardly opening check valve in said conduit, a third tube nested between said first mentioned tubes, rotary means for producing telescopic movement of said third tube, and coupling means at the outer end of said third tube.

5. A lubricant compressor comprising a barrel, a piston for expelling the contents thereof, a piston rod threaded through one end of said barrel for actuating said piston, a fixed discharge tube at the other end of said barrel, a movable discharge tube having threaded relation with said fixed tube, an outwardly opening check valve in the inlet end of said fixed tube, and coupling means at the outer end of said movable tube for forming a sealed connection and for preventing rotation of said movable tube when said fixed tube is being screwed into it.

6. A lubricant compressor comprising a barrel, compressing means for expelling the contents thereof, a fixed discharge tube at the other end of said barrel, a movable discharge tube having threaded relation with said fixed tube, an outwardly opening check valve in the inlet end of said fixed tube, and coupling means at the outer end of said movable tube for forming a sealed connection and for preventing rotation of said movable tube when said fixed tube is being screwed into it.

7. In lubricating apparatus of the class described, a lubricant compressor comprising a lubricant containing barrel having a reduced end portion, a protective sleeve secured to said reduced end portion, a valve unit protected by said reduced end portion and said protective sleeve, said valve unit being removable completely assembled from said reduced end portion pursuant to the removal of said protective sleeve, and a high pressure cylinder threaded on said valve unit and having its outward movement limited by said sleeve.

8. In lubricating apparatus of the class described, a lubricant compressor comprising a lubricant containing barrel having at one end thereof a reduced end portion interiorly and exteriorly threaded, a protective sleeve presenting internal threads engaging the external threads of said reduced end portion and a completely assembled valve unit presenting exterior threads engaging the interior threads of said reduced end portion, said valve unit being protected by said sleeve.

In witness whereof, I hereunto subscribe my name this 23rd day of April, 1923.

JOHN N. ROBIN.